3,094,510
NON-CRYSTALLIZING POLYESTER, AND POLY-
URETHANE MADE THEREFROM
John A. Parker, Lancaster Township, Lancaster County,
and John Versnel, Manor Township, Lancaster County,
Pa., assignors to Armstrong Cork Company, Lancaster,
Pa., a corporation of Pennsylvania
No Drawing. Filed July 27, 1960, Ser. No. 45,543
4 Claims. (Cl. 260—75)

This invention relates generally to polyesters and more particularly to polyesters suitable for modification with organic diisocyanates. Still more particularly the invention relates to the formation of a polyester from which can be made a non-crystallizing polyurethane having extraordinarily low temperature stability.

It is known to prepare polyesters by reacting dicarboxylic acids and glycols to acid numbers of less than 5 and hydroxyl numbers in the range of 20–80 and preferably 50–70. These polyesters may subsequently be reacted with a molecular excess of an organic diisocyanate to form what may be termed a prepolymer. The prepolymer may subsequently be reacted or cross-linked with a glycol to form hard, tough, rubbery products having a wide variety of uses. Full details of such a process are set forth in U.S. 2,729,618—Muller et al., issued January 3, 1956.

The properties of the final cast polyurethanes prepared as described above generally depend on the property of the polyester from which the final product is made. The polyester constitutes the backbone of the polyurethane. One of the great difficulties of cast polyurethanes prepared as described above has been the tendency of the polyurethane to crystallize or to form crystal structures on standing. Where crystallization has taken place, heat build-up due to hysteresis frequently results in crystalline melting and failure of the cast polyurethane product. Although the internal crystalline melting point often amounts to 50° or 60° C. above ambient temperature of the product, hysteresis loss can frequently, depending on the end use, produce an internal temperature increase of 60° to 70° C. This situation is particularly prevalent in applications of the polyurethanes as moving belts, diaphragms, and any application involving repeated shock or flexing. Additionally, any low temperature applications of the polyurethane will swiftly enhance the crystallization in the product. Thus there is a clear need for a polyurethane which will maintain its amorphous state under ambient conditions and which will not crystallize even at low temperatures of minus 70° F.

It is the primary object of the present invention to present such a product. It is another object of the present invention to utilize the ingredients customarily used in the preparation of polyesters suitable for use in the manufacture of cast polyurethanes in order to prepare a non-crystallizable cast polyurethane therefrom. An additional object is to present a process technique in the making of a polyester to insure the production of an amorphous polyester.

These objects are accomplished by careful selection of ingredients for the making of a polyester and careful control of reaction conditions. The invention contemplates use of adipic acid as the dicarboxylic acid. To be reacted with the adipic acid there should be used a mixture of two specific glycols, namely, 1,4-butanediol and 2,2-dimethyl-1,3-propylene glycol. The mixture of the glycols should be utilized in an amount of from 40%–60% by weight of the 1,4-butanediol based on the total weight of the two glycols. The total amount of the glycol mixture to be used will be that amount sufficient to react with all the acid groups in the adipic acid plus an excess. The reaction will be carried out at a temperature in the range of 250°–420° F. to an acid number in the range of 1.5–2.5 and a hydroxyl number in the range of 50–60. During processing, the hydroxyl number must be brought up to 80–86 at a time when the acid number is in the range of 18–22. Under these conditions, an amorphous, non-crystallizable polyester will be produced which, after prepolymer formation and cross-linking with a glycol, will yield an amorphous and non-crystallizable cast polyurethane product.

The mixture of two glycols is critical since either one alone will yield a crystallizable polyester and polyurethane. Additionally, mixtures of other glycols will also produce crystallizable polyesters and polyurethanes. It is one of the unexpected features of the present invention that only the mixture within the amount stated of 1,4-butanediol and 2,2-dimethyl-1,3-propylene glycol will produce the non-crystallizing polyester. It is postulated that the dimethyl groups protruding from the propylene glycol prohibit the proximity of polyester chains necessary for crystallization.

The making of a polyester using glycols and dicarboxylic acids always involves the formation of different polyester species. These polyester species taken together make up the bulk polyester which is the final product in any polyester manfacture. Slightly different ingredients or slightly different amounts of the same ingredients or slightly different reaction conditions will produce a bulk polyester containing different polyester species from those prepared under the slightly different conditions. Thus modest changes in ingredients and conditions may mean the difference between success and failure where the formation of a tough, hard, cast polyurethane product is involved. Only certain polyester species in the bulk polyester can consistently yield a non-crystallizable cast polyurethane at ambient temperatures or at very low temperatures.

In preparing the polyester the 1,4-butanediol and the 2,2-dimethyl-1,3-propylene glycol are charged to a kettle, and agitation and warming are begun. The adipic acid is then added, and the batch is heated to a temperature in the range of 250°–280° F. A blanket of inert gas such as nitrogen or carbon dioxide is maintained in the kettle, preferably being bubbled through the charge in order to aid in sweeping water of condensation out of the reaction mixture. The temperature is gradually increased, commensurate with maintaining a reflux without flooding of the reflux condenser. Once the charge has reached a temperature of 400° F., the acid and hydroxyl numbers should be checked occasionally, say every two hours.

When the acid number has dropped to 18–22, the hydroxyl number should be adjusted to fall within the range 80–86. This adjustment is done by adding 1,4-butanediol to the reaction mixture. A convenient means for determining the precise amount of additional 1,4-butanediol to be added to adjust the hydroxyl number is: pounds or grams of 1,4-butanediol=0.000802 x weight of the total batch in pounds or grams. It will be found that this adjustment will be made generally about 4 hours prior to the completion of the polyester synthesis. It is this balancing of the hydroxyl number and acid number at this point in the reaction which insures that the final bulk polyester will contain the proper polyester species through transesterification to produce an amorphous, non-crystallizable polyester which will be suitable for the manufacture of amorphous, non-crystallizing polyurethanes.

After the reaction is complete the batch is cooled to 250°–300° F. for removal from the reaction kettle into drums or other suitable containers. This polyester may then be utilized as described in above-mentioned U.S. 2,729,618—Muller et al. for the manufacture of cast polyurethane products such as belts, diaphragms, and the like which will not crystallize at the very low temperatures which produce crystallization in cast polyurethanes prepared other than by the process outlined herein.

The following examples illustrate several embodiments of the invention. All parts are by weight unless otherwise stated.

Example 1

Into a kettle equipped with a reflux condenser and agitator are placed 10,040 grams of 1,4-butanediol and 10,100 grams of 2,2-dimethyl-1,3-propylene glycol. Heat was put on the kettle. The agitator was turned on, and a carbon dioxide gas flow of 5-6 liters per minute was started bubbling through the batch. To the stirring mixture of glycols was added 25,555 grams of adipic acid, and the batch was heated gradually to 400° F. over a period of four hours. When the temperature reached 400° F., acid and hydroxyl numbers were measured every two hours. After six hours, the acid number measured 20 and the hydroxyl number measured 78. Accordingly, 56.2 grams 1,4-butanediol was added to take the hydroxyl number up to 80. The temperature was raised to 430° F. and maintained at that temperature until the acid number was 2 and the hydroxyl number was 58, 24 hours being required. The polyester was then cooled to 260° F. and drained off into a drum for later use.

Example 2

To form the prepolymer, 100 grams of the polyester 1,4-butylene-neopentyl-adipate, prepared as described above, was dehydrated at 135° C. at 60 mm. Hg pressure for two hours. The dehydration was conducted under constant agitation. When dehydration was complete, 43.75 grams (0.187 mole) diphenyl methane 4,4'-diisocyanate was added to the 0.05 mole of polyester at 135° C. The ratio of diisocyanate groups to hydroxyl groups was approximately 3.5. Heat was shut off, but the reaction exothermed to a maximum temperature of 147° C.

Once the exotherm had subsided, the prepolymer was placed under 20 mm. Hg absolute pressure for 5 minutes to remove most of the gas formed in the polymer. When degassing was complete, the prepolymer was reacted with 10.97 grams (0.122 mole) 1,4-butanediol as a cross-linking agent at 120° C. The mixture was mixed rapidly for 20-30 seconds and then poured into a hot mold to form a casting. The casting was placed in a 110° C. oven for a 24-hour curing cycle.

The embrittlement temperature of this final polyurethane product was minus 93° F. Where ethylene glycol was substituted for the 1,4-butanediol cross-linking agent, all other conditions being the same, the embrittlement temperature was minus 80° F. Where ethylene glycol was substituted for both the 1,4-butanediol and the 2,2-dimethyl-1,3-propylene glycol to form a polyethylene adipate polyester, all other conditions being the same, the embrittlement temperature of the final polyurethane was minus 30° F.

We claim:

1. A non-crystallizing polyester suitable for forming a relatively temperature-insensitive polyurethane comprising the reaction product of adipic acid and sufficient of a mixture of 1,4-butanediol and 2,2-dimethyl-1,3-propylene glycol to react with all the acid groups in the adipic acid, said mixture containing 40-60% by weight 1,4-butanediol, said polyester having an acid number in the range of 1.5-2.5 and a hydroxyl number in the range of 50-70.

2. In the process of making a polyester having an acid number in the range of about 1.5-2.5 and a hydroxyl number in the range of about 50-65 by reacting adipic acid with sufficient of a mixture of 2,2-dimethyl-1,3-propylene glycol and 1,4-butanediol to react with all the acid groups in the adipic acid at a temperature in the range of about 250°-430° F., said mixture containing 40-60% by weight 1,4-butanediol, the improved method of controlling polyester species in the polyester product to produce a non-crystallizing polyester which comprises adjusting the hydroxyl number of the polyester to 80-86 at a temperature of about 400° F. by adding 1,4-butanediol thereto when the acid number of the polyester is in the range of 18-22.

3. A non-crystallizing, relatively temperature-insensitive polyurethane which comprises the reaction product of a substantially equal molecular amount of 1,4-butanediol and 2,2-dimethyl-1,3-propylene glycol with adipic acid to produce a polyester having an acid number in the range of 1.5-2.5 and a hydroxyl number in the range of 50-70, said polyester being reacted with diphenyl methane 4,4'-diisocyanate in a mole ratio of diisocyanate:polyester of about 3.5:1 at a temperature in the range of about 80°-110° C. to form a prepolymer, said prepolymer being reacted with 1,4-butanediol in an amount of about 0.7-1.2:1 moles of said diol per mole of said prepolymer at a temperature in the range of about 140° C. in a mold to form a shaped product.

4. A process of making a polyurethane which is non-crystallizing to a temperature of about minus 70° F. comprising forming a polyester having an acid number in the range of 1.5-2.5 and a hydroxyl number in the range of 50-70 by reacting adipic acid with sufficient of a mixture of 1,4-butanediol and 2,2-dimethyl-1,3-propylene glycol to react with all the acid groups in the adipic acid, said mixture containing 40-60% by weight 1,4-butanediol, reacting the resulting polyester with diphenyl methane 4,4'-diisocyanate in a mole ratio of diisocyanate:polyester of about 3.5:1 at a temperature in the range of about 80°-110° C., cross-linking the resulting prepolymer with 1,4-butanediol in an amount of about 0.7-1.2:1 moles of said diol per mole of said prepolymer, and pouring the resulting mixture into a mold to form a shaped product.

References Cited in the file of this patent
UNITED STATES PATENTS

| | | |
|---|---|---|
| 2,621,166 | Schmidt et al. | Dec. 19, 1952 |
| 2,729,618 | Muller et al. | Jan. 3, 1956 |
| 2,871,218 | Schollenberger | Jan. 27, 1959 |
| 2,912,408 | Nischk et al. | Nov. 10, 1959 |
| 2,953,539 | Keplinger et al. | Sept. 20, 1960 |